United States Patent Office 2,968,160
Patented Jan. 17, 1961

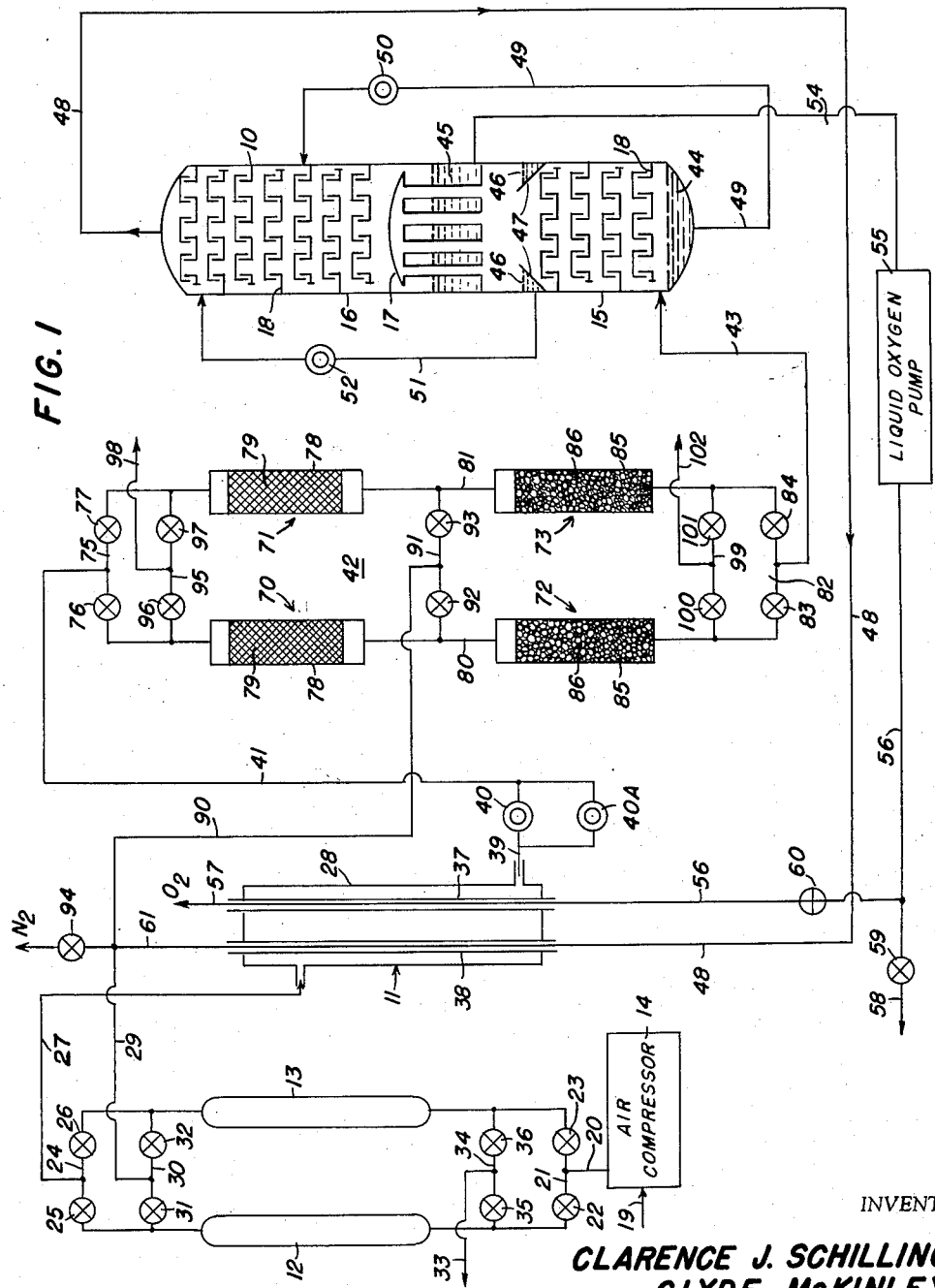

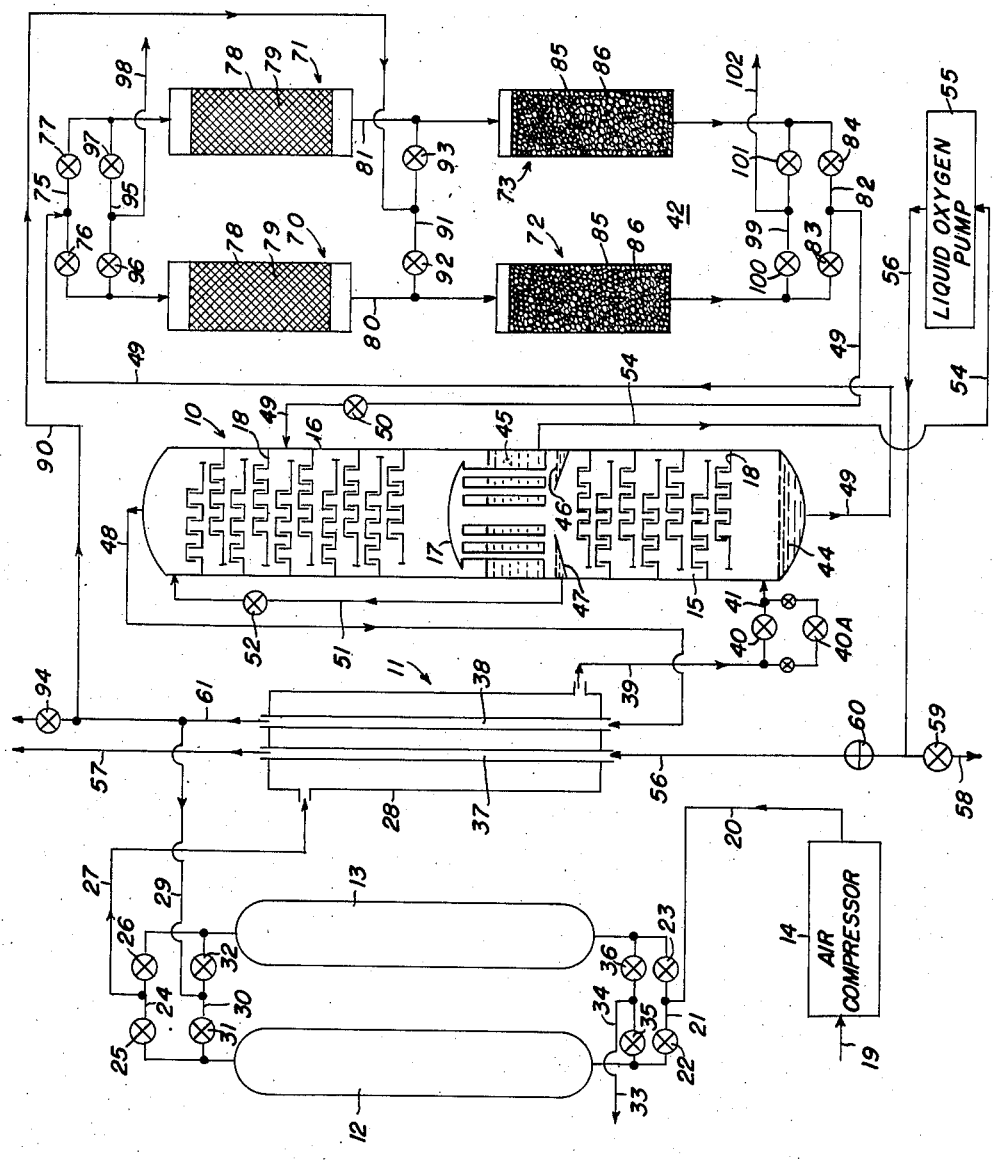

2,968,160

METHOD AND APPARATUS FOR SEPARATING GASEOUS MIXTURES INCLUDING HIGH BOILING POINT IMPURITIES

Clarence J. Schilling and Clyde McKinley, Allentown, Pa., assignors to Air Products Incorporated, a corporation of Michigan Filed Apr. 9, 1956, Ser. No. 576,963

26 Claims. (Cl. 62—14)

This invention relates to improvements in the separation of components of gaseous mixtures by low temperature liquefaction and fractionation and more particularly to methods of and apparatus for removing from the fractionation operation high boiling point impurities introduced into the operation with the gaseous mixture.

It is known that high boiling point impurities present in gaseous mixtures must be removed or reduced to comprise an insignificant percentage of the gaseous mixture in order to prevent difficulties in the operation of a low temperature fractionating cycle. For example, in the separation of air into its oxygen and nitrogen components, carbon dioxide in the air stream fed to the cycle must be removed from the cycle to prevent accumulations of carbon dioxide particles in the cycle, particularly in the colder portions of the cycle. Such carbon dioxide accumulations affect operation of the cycle and eventually require the cycle to be shut down and defrosted. Also, it is necessary to provide means for removing from the cycle other high boiling point components of the air, particularly hydrocarbons which when concentrated at points in the cycle comprise a serious explosion hazard.

Several methods have been employed in the past for removing high boiling point impurities from gaseous mixtures to be separated, such as the removal of carbon dioxide from air. In one method the air stream prior to its entry into the fractionating cycle is chemically treated, by scrubbing with a caustic solution, to remove carbon dioxide therefrom. This method requires bulky equipment, materially increases the initial and operating costs and reduces the flexibility of the cycle.

Another method attempts to remove the carbon dioxide by low temperature precipitation. This is accomplished by means of switching heat exchangers of the regenerative or recuperative type in which the stream of incoming high pressure air is cooled to a temperature below the precipitation temperature of carbon dioxide upon heat interchange with a stream of cold relatively low pressure product of the fractionating operation. The carbon dioxide precipitated from the air stream collects in one zone or passageway of the heat exchanger, and upon the heat exchanger being switched, a stream of product gas, such as nitrogen, is caused to flow through the zone or passageway in which the carbon dioxide has deposited, in a direction countercurrent to the direction of air flow therethrough, to sweep out the carbon dioxide deposits. Due to the difference of the specific heats of higher pressure air and the lower pressure product gases, the stream of product gas is not effective to completely sweep out the carbon dioxide deposits and systems must be employed to unbalance the heat exchangers. Even in cycles employing unbalanced heat exchangers particles of carbon dioxide are entrained in the air stream flowing through the heat exchangers and accumulate at some point in the cycle producing malfunctions and requiring eventual shut down for defrosting. In addition, switching heat exchangers are expensive to manufacture and the frequent switching required presents mechanical and operational difficulties.

Other known cycles for fractionating gaseous mixtures, such as air, include arrangements for scrubbing the air stream before liquefaction with a liquid rich in one component of the gaseous mixture. These cycles require special equipment for removing impurities from the scrubbing liquid and require the use of a scrubbing column which materially adds to the size, mass and expense of the equipment.

The novel methods provided by the present invention are operable to substantially completely remove high boiling point impurities, such as carbon dioxide and hydrocarbons in the case of air, from a fractionating cycle without requiring chemical treatment of the air, switching heat exchangers or low temperature scrubbing columns. According to the present invention this is accomplished by controlling the incoming gaseous mixture, including high boiling impurities in such a manner so that high boiling point impurities pass with the stream of gaseous mixture through the main heat exchanger, where the temperature of the stream of gaseous mixture is reduced by heat exchange with relatively cold product of the fractionating operation, and then through an expansion valve. The expanded stream of gaseous mixture includes precipitated impurity and non-precipitated impurity, the precipitated impurity and the non-precipitated impurity together comprising substantially the total high boiling impurity content of the stream of gaseous mixture. A fluid stream, including substantially the total high boiling impurity in the stream of expanded gaseous mixture, is formed from the stream of expanded mixture and passed through a filter-adsorber combination to substantially completely remove high boiling impurities therefrom. The fluid stream is then fed to a fractionating zone.

Other advantages and features of the present invention will appear more fully below from the following detailed description considered in connection with the accompanying drawings which disclose two embodiments of the invention. It is to be expressly understood, however, that the drawings are designed for purposes of illustration only and not as a definition of the limits of the invention, reference to the latter purpose being had to the appended claims.

In the drawings, in which similar reference characters denote similar elements throughout the several views:

Figure 1 is a diagrammatic illustration of a gaseous mixture separating cycle embodying the principles of the present invention, and Figure 2 is a diagrammatic showing of a gaseous mixture separation cycle construction in accordance with another embodiment of the present invention.

With reference more particularly to Figure 1 of the drawings, there is shown a gaseous mixture separation cycle constructed in accordance with the principles of the present invention including a fractionating column 10, a heat exchanger 11, a pair of dryers 12 and 13, and a compressor 14. The column 10 is of the two-stage type including a high pressure section 15 and a low pressure section 16 separated by a refluxing condenser 17 of conventional construction.

The high pressure section and the low pressure section are each provided with liquid-vapor contact means, such as a series of horizontally spaced bubble plates 18, as shown. A stream of gaseous mixture, such as atmospheric air, is introduced by way of conduit 19 to the input of the compressor 14. The compressor 14 may be of a multiple stage type including inner coolers and after coolers in accordance with conventional practice. The stream of compressed air from the compressor is conducted through a conduit 20 and through a cross-connection 21, provided with control valves 22 and 23, to one of the pair of dryers 12 and 13, such as the dryer 13. The exit end of the dryers are provided with a cross-connection 24 having control valves 25 and 26 for conducting the stream of air leaving either of the dryers, such as the dryer 13, to a conduit 27 leading to the shell 28 of the heat exchanger 11.

The dryers 12 and 13 are of conventional construction and each contain a bed of adsorbent material adapted for removing moisture from the air streams flowing therethrough, such as beds of silica-gel. A stream of relatively warm nitrogen gas, derived from a source described below, is provided for reactivating the adsorbent beds when the dryers are off-stream. For this purpose a conduit 29 conducts a stream of relatively warm nitrogen gas to either of the dryers through a cross-connection 30 provided with control valves 31 and 32. The reactivating gas stream thus flows through the dryers while off-stream in countercurrent relation with the direction of flow of the air stream therethrough and leaves the dryers at their other ends through a conduit 33 connected to a cross-connection 34 having control valves 35 and 36.

The stream of dry compressed air entering the heat exchanger 11 by way of the conduit 27 passes through the shell of the heat exchanger in countercurrent heat exchange relationship with streams of relatively cold product from the fractionating column 10. In particular, streams of oxygen and nitrogen product flow through passageways 37 and 38, respectively, of the heat exchanger in countercurrent heat exchange relation with the incoming stream of compressed dry air which leaves the shell of the heat exchanger by way of a conduit 39 at a relatively low temperature. The stream of cooled compressed air is conducted by the conduit 39 to an expansion valve 40 by which the air stream is expanded to a relatively low pressure with a concomitant reduction in its temperature, and the air stream following the expansion valve is introduced by way of a conduit 41, filter-adsorber combination 42, described below, and conduit 43 into the high pressure section 15 of the fractionating column 10. Preliminary fractionation of the air takes place in the high pressure section 15 producing liquid crude oxygen fraction collecting in a pool 44 in the base of the high pressure section and a gaseous fraction which flows upwardly into the condensing tubes of the refluxing condenser 17 and is liquefied upon heat interchange with boiling liquid oxygen product collecting in a pool 45 in the base of the low pressure section. The liquefied gaseous high pressure fraction flows downwardly from the refluxing condenser with a portion collecting in a pool 46 provided by a trough 47 and with the remainder entering the low pressure section as reflux. The fractionation operation is completed in the low pressure section 16 producing liquid oxygen product collecting in the pool 45 in the base of the low pressure section and a gaseous nitrogen product which collects in the dome of the low pressure section and is withdrawn therefrom by way of a conduit 48. A stream of liquid crude oxygen is withdrawn from the pool 44 to provide feed for the low pressure section. For this purpose a conduit 49 communicates with the base of the high pressure section through which a stream of liquid crude oxygen is conducted and introduced at a medial point into the low pressure section following flow through an expansion valve 50. A stream of liquefied gaseous fraction is withdrawn from the pool 46 by way of a conduit 51, expanded in an expansion valve 52, and introduced into the upper end of the low pressure section as reflux. The oxygen product may be withdrawn from the column by means of a conduit 54 communicating with the pool 45 and connected to the inlet of a liquid oxygen pump 55 which functions to increase the pressure of the oxygen product to a predetermined, desired value. A stream of high pressure liquid oxygen leaves the pump through a conduit 56 and is conducted thereby to the passageway 37 of the heat exchanger 11 wherein the liquefied high pressure oxygen product is vaporized upon passing through the heat exchanger in countercurrent heat exchange relation with the incoming stream of compressed air, the stream of oxygen product being conducted from the heat exchanger by way of a conduit 57 in gaseous phase and at the predetermined pressure as established by the oxygen pump 55. The cycle may be operated to produce high pressure liquid oxygen as product and for this purpose a liquid oxygen delivery conduit 58 having a control valve 59 is joined to the liquid oxygen conduit 56 upstream of the heat exchanger, and a control valve 60 is located in the conduit 56 downstream of the conduit 58. When the cycle is delivering liquid oxygen the incoming air is compressed to a higher value and the air stream is partly liquefied upon expansion in the valve 40, whereas during other phases of operation the air stream leaving the expansion valve 40 may be substantially completely in gaseous phase. The stream of gaseous nitrogen product withdrawn from the low pressure section is conducted by the conduit 48 to the cold end of the passageway 38 of the heat exchanger. The stream of nitrogen product flows through the heat exchanger in countercurrent heat exchange relation with the incoming air stream and leaves the heat exchanger by way of a conduit 61 at substantially atmospheric temperature and pressure. The stream of relatively warm nitrogen gas employed for reactivating the air dryers may be obtained from the outgoing stream of nitrogen product flowing through the conduit 61. For this purpose the conduit 29 may be joined to the conduit 61 as shown in the drawing. While the present invention is disclosed and described in the environment of the separation of atmospheric air into its oxygen and nitrogen components, it is to be expressly understood that the principles of the present invention are not limited to the separation of air but may be employed with cycles designed for the separation of other gaseous mixtures, such as hydrocarbons.

According to one mode of operation of the present invention the compressor 14 produces a stream of air under relatively high superatmospheric pressure such that the relatively low temperature air stream leaving the cold end of the heat exchanger 11 is above the precipitation temperature of high boiling point impurities included in the gaseous mixture, such as carbon dioxide. Thus, the carbon dioxide passes through the compressor, the air dryers, and the hear exchanger 11 in gaseous phase as a component of the air stream. The pressure of the air stream is reduced upon flowing through the expansion valve 40 with a concomitant drop in its temperature to a value below the precipitation temperature of carbon dioxide corresponding to the expanded pressure. This action results in precipitation of substantially the total quantity of the carbon dioxide component of the air stream and the expanded air thus includes precipitated carbon dioxide and non-precipitated carbon dioxide. A fluid stream comprising components of the expanded air and including substantially the total carbon dioxide in the expanded air is formed from the expanded air and conducted through a conduit 41 to the filter-adsorber combination 42. The filter-adsorber combination 42 functions to substantially completely remove precipitated high boiling impurity and non-precipitated high boiling impurity in the fluid stream conducted through the conduit 41 and to deliver the fluid stream, substantially free of impurities, to the high pressure fractionating zone by way of the conduit 43.

The filter-adsorber combination comprises a pair of filters 70, 71 and a pair of adsorbers 72, 73 provided with cross-connections and control valves so that either of the filters and its corresponding adsorber, such as filter 70 and adsorber 72, or filter 71 and adsorber 73, may be connected in series with the conduits 41 and 43, while isolating the other filter and adsorber from the incoming air feed to allow for purging and reactivation. In particular, the conduit 41 communicates with a cross-connection 75 having connections with the upper ends of the filters 70 and 71 and being provided with control valves 76 and 77. The filters each comprise a cylindrical casing 78 enclosing a suitable filling 79 for stripping solid particles of precipitated high boiling point impurity from the fluid stream flowing therethrough. It has been found in actual practice that sheets formed of sintered metal powder provide an adequate media for this performance. The filtered stream leaves the lower end of either of the filters by way of conduits 80 or 81 which are connected to the upper ends of the adsorbers 72 and 73, respectively. The outlets of the adsorbers, at their lower ends, are joined by a cross-connection 82 feeding the conduit 43, the cross-connection 82 including control valves 83 and 84. The adsorbers 72 and 73 each comprise a casing 85 filled with granular adsorbent material 86 capable of adsorbing the high boiling impurity present. Silica gel or alumina gel have been found to be effective adsorbers for carbon dioxide and hydrocarbons.

When a fluid stream including precipitated impurity and non-precipitated impurity flows through one of the filters 70 or 71 a greater portion of the precipitated impurity is stripped from the fluid stream and is retained in the filter filling 79 while non-precipitated impurity and precipitated impurity that may be entrained in the fluid flowing through the filter is present in the fluid stream leaving the filter. This results from the fact that mechanical filters are incapable of removing non-precipitated impurity and due to characteristics inherent in mechanical filters are inoperable to completely strip solid impurity from the fluid stream passing therethrough. In accordance with the principles of the present invention the adsorbers 72 or 73 not only adsorb non-precipitated impurity in the fluid stream leaving the filters but also remove solid particles of impurity not trapped in the filters, and the fluid stream leaving the adsorbers 72 or 73 and fed to the fractionating zone 15 is substantially completely free of impurity, such as carbon dioxide. The non-precipitated impurity is removed from the fluid stream by an adsorption process, but it is not known by what process the adsorbers remove impurity in solid phase. It is believed the solid impurity is removed by an adsorption process following vaporization in the adsorbers and not by a mechanical filtering operation. This is so since the interstices of the beds of adsorbing material 86 are larger than the openings presented by the fillers 79 through which the solid particles pass and are present in the fluid stream entering the adsorbers. Whether or not this theory is correct, it has been discovered that the adsorbers function to remove solid particles of impurity passed through the filters, as well as non-precipitated impurity, and the fluid stream leaving the adsorbers is substantially free of high boiling impurity, such as carbon dioxide in the case of separation of air.

The filters 70 and 71 and the adsorbers 72 and 73 are designed to provide the required filtering and adsorbing characteristics to substantially completely remove high boiling impurities from the fluid stream with a minimum volume of filter material 79 and adsorbing material 86 and without requiring the filters and adsorbers to be switched at relatively short intervals. While there are a number of factors that must be taken into consideration in order to determine the proper capacity of the filters and the adsorbers, the quantity of high boiling impurity present in the stream of gaseous mixture entering the cycle is of primary influence. In the case of separation of atmospheric air, it has been determined that atmospheric air normally includes a carbon dioxide content of 320 p.p.m. Since the rate of flow of air feed to a separation cycle is dictated by the capacity of the cycle, the rate of flow of carbon dioxide into the cycle may be determined by calculations. Furthermore, the portion of the impurity in solid phase and the portion of the impurity that is not precipitated may be determined from the temperature and pressure of the air after expansion. Also, the portion of the impurity that may be dissolved in the fluid stream may be ascertained by determining the solubility of the impurity in the fluid stream. Thus, the size of the filters are designed to process a fluid stream of a predetermined rate of flow and including a known solid impurity content without necessitating an excessive switching rate. The capacity of the adsorbers is determined by the portion of the non-precipitated impurity and the portion of the impurity that may be dissolved in the fluid stream as well as the percentage of solid impurity passing through the filters. The latter may be determined by experimentation, while the former is a function of the phase composition of, and the solubility of the impurity in, the fluid stream. For example, in an air separation cycle in which the air stream is not liquefied upon expansion in the expansion valve 40 but is cooled to saturation temperature an insignificant portion of the carbon dioxide content of the air will exist as non-precipitated impurity in the fluid stream flowing to the filter-adsorber combination 42. This results from the solid-vapor equilibria of the air-carbon dioxide system. Thus the capacity of the adsorbers may be determined solely upon consideration of the percentage of solid impurity passed through the filters since the percentage of the total carbon dioxide that is not precipitated in the gaseous stream is so small as not to adversely affect operation of the cycle. Of course the adsorbers will inherently adsorb non-precipitated dissolved impurity and their capacity may be designed for this purpose. In an air separation cycle designed to produce liquid oxygen product, the cycle is operated with partial liquefaction of the air feed in the expansion valve 40. Since carbon dioxide is soluble in liquefied air a portion of the carbon dioxide impurity will be dissolved in the liquid air and influence the adsorber capacity. Thus, in a separation cycle in which liquefaction occurs upon expansion, the capacity of the adsorbers is a function of the liquefied percentage of the gaseous mixture based upon the solubility of the high boiling impurity in the liquefied gaseous mixture, as well as the portion of solid impurity passing through the filters and the percentage of the total impurity that is not precipitated.

Duplicate filters 70 and 71 and adsorbers 72 and 73 are provided so that one filter-adsorber set, i.e., filter 70 and adsorber 72, or filter 71 and adsorber 73, may be on-stream removing carbon dioxide deposits from the fluid stream on its way to the fractionating operation, while the filter and the adsorber of the other set are being purged or reactivated, respectively. The control valves 76, 77, 83 and 84 in the cross-connections 75 and 82 are operable to determine which set is on-stream or off-stream. The present invention provides a novel arrangement for purging the filters and for reactivating the adsorbers when off-stream. This arrangement includes a conduit 90 having a connection with the outlet nitrogen product conduit 61 for conducting a stream of relatively warm nitrogen product gas through a cross-connection 91 to the conduits 80 or 81 connected between the outlet of the filters and the inlet of the adsorbers, the cross-connection being provided with control valves 92 and 93. A control valve 94 may be provided in the conduit 61 downstream of the connection of the conduit 90 therewith to determine the mass of relatively warm nitrogen product fed to the conduit 90. The valve 94 also functions to determine the mass of relatively warm nitrogen product gas flowing through the conduit 29 for reactivating the dryers 12 and 13. With the valves 92 or 93 open, a stream of relatively warm nitrogen product flows into the conduits 80 or 81 with one portion of the stream flowing upwardly into a respective filter and another portion of the stream flowing downwardly into a respective adsorber. The portion of the relatively warm nitrogen product stream passing upwardly in either of the filters flows through the filter medium 79 in countercurrent relation with the direction of flow of the fluid stream therethrough and sweeps from the filter solid particles of high boiling point impurity accumulated therein. The stream of nitrogen product gas carrying the solid particles of high boiling point impurity passes from the filters through a cross-connection 95, provided with control valves 96 and 97, to a discharge conduit 98. The other portion of the stream of relatively warm nitrogen product flowing downwardly in the conduits 80 or 81 enters a respective adsorber and flows through the adsorptive bed 86 in a direction corresponding to the direction of flow of the fluid stream therethrough. The stream of reactivating gaseous nitrogen from the adsorbers passes through cross-connection 99, provided with control valves 100 and 101, and is exhausted to the atmosphere through a conduit 102.

The control valves in the cross-connections 75, 82, 91, 95 and 99 may be operated automatically and in synchronism to alternately conduct the fluid stream, at predetermined intervals, through the filter-adsorber sets 70—72 and 71—73 and to alternately conduct the purging and reactivating gas stream through the filter-adsorber sets when off-stream. In cases where the purging and reactivation cycles of the filters and adsorbers is less than the switching period of the filter-adsorber sets the valves controlling the cross-connections 91, 95 and 99 may be operated for a shorter interval but in synchronism with the switching cycle. In particular, when the filter-adsorber set 70—72 is on-stream valves 76 and 83 are open and valves 77 and 84 are closed. These valves are moved to the opposite positions when it is desired to pass the fluid stream through the filter-adsorber set 71—73. With respect to the purging and reactivating cycle, when the filter-adsorber set 70—72 is on-stream, valves 92, 96 and 100 are closed and valves 93, 97 and 101 are open, and when the filter-adsorber set 71—73 is on-stream the valves are moved to their opposite positions to conduct the purging and reactivating gas stream only through the filter-adsorber set 71—73.

The novel arrangement provided by the present invention for purging the filters and for reactivating the adsorbers provides several advantages. The feature of purging the filters by flowing the nitrogen gas stream in counter-current relation with respect to the direction of flow of the fluid stream therethrough provides the most efficient purging operation since the carbon dioxide deposits may be blown from the filter surfaces and it is not necessary to evaporate the deposits. On the other hand, flowing the nitrogen stream through the beds of adsorptive material 76 in the direction of flow of the fluid stream provides the most effective reactivation without disturbing the adsorptive beds. The arrangement also provides for separate purging of the filters and reactivation of the adsorbers while utilizing a single control. This prevents contamination of either the filters or the adsorbers by impurities accumulated in the other, and reduces the time required for purification to that time required to purge the filters or to reactivate the adsorbers whichever is greater. The rate of flow of the nitrogen gas through the filters and the adsorbers during the purification process may be controlled by adjusting the valves 96 and 97 and 100 and 101 so that the filters may be purged and the adsorbers reactivated during substantially the same time interval thus aiding in controlling the temperature level of the filter-adsorber sets during the purification process.

Another embodiment of the invention is shown in Figure 2 of the drawings. In this embodiment the fluid stream from the expansion valve 40, including precipitated and non-precipitated high boiling impurity and dissolved high boiling impurity should the fluid stream include liquid, is fed by way of the conduit 41 directly into the high pressure stage 15 of the fractionating column, while the filter-adsorber combination 42 is located in the crude oxygen conduit 49 leading from the base of the high pressure section to a medial point of the low pressure section 16. In particular, as illustrated in Figure 2, the crude oxygen conduit 49 leads from the base of the high pressure section to the cross-connection 75 feeding the filters 70 and 71, and communicates with the cross-connection 82 joined to the discharge ends of the adsorbers 72 and 73 and a medial point of the low pressure section. The crude oxygen expansion valve 50 may be located downstream of the filter-adsorber combination as shown, or between the high pressure section and the inlet to the filters.

In operation of this embodiment of the invention the expanded gaseous mixture downstream of the expansion valve includes precipitated and non-precipitated high boiling impurity and dissolved high boiling impurity should the expanded stream include liquid, which together comprises substantially the total impurity introduced into the cycle by the stream of gaseous mixture. The portions of the total impurity that is precipitated, that is non-precipitated, or is dissolved in the fluid stream entering the high pressure section depends upon the temperature and pressure and phase composition of the fluid stream and its solubility characteristics. For example, in the separation of air in which liquefaction does not occur in the expansion valve 40, substantially the total carbon dioxide content of the air stream is present in solid phase while an insignificant portion of the total carbon dioxide comprises non-precipitated impurity in the gaseous stream entering the high pressure section. On the other hand, in the case of a liquid oxygen cycle partial liquefaction of the air occurs upon expansion and a significant portion of the precipitated carbon dioxide is dissolved in the liquefied portion of the fluid stream introduced into the high pressure section. In a cycle in which expansion of the air stream does not result in liquefaction, the precipitated carbon dioxide in solid phase is swept through the conduit 41 and introduced into the high pressure section. A major portion of the solid carbon dioxide flows directly into the pool 44 of crude oxygen and a minor portion which may be entrained in the gas flowing upwardly in the high pressure section is transferred to the liquid crude oxygen by the scrubbing action of liquid reflux flowing downwardly in the high pressure section. The non-precipitated portion of the carbon dioxide in the gaseous air stream entering the high pressure section constitutes an insignificant percentage of the total carbon dioxide content and its presence does not adversely affect operation of the cycle. However, the scrubbing action of the liquid reflux in the high pressure section will transfer non-precipitated carbon dioxide to the liquid crude oxygen. Should the cycle be operated to produce partial liquefaction of the air, a portion of the solid carbon dioxide is dissolved in the liquified portion flowing into the pool of liquid crude oxygen.

The carbon dioxide impurity introduced into the high pressure section in solid phase and as carbon dioxide dissolved in liquefied air, collects in the pool 44 of liquid crude oxygen partly in solid phase and partly dissolved in the liquid. A portion of the solid impurity is removed from the crude oxygen stream upon flowing through the filters 70 or 71 and the adsorbers 72 and 73 function to adsorb the impurity dissolved in the crude oxygen stream and to remove from the crude oxygen stream solid impurity passing through the filters. As mentioned above in connection with the embodiment of Figure 1, it is believed the solid impurity passed to the adsorbers 72 and 73 is removed from the crude oxygen stream by an adsorption process following vaporization of the solid particles, but irrespective of the correctness of this theory it has been determined that solid impurity passed through the filters is removed from the crude oxygen stream upon flowing through the adsorbers.

The capacity of the filters and adsorbers is determined by the rate of flow of liquid low boiling fraction from the high pressure section, such as liquid crude oxygen, the impurity content of the feed mixture and the solubility of the impurity in the liquid low boiling fraction. As mentioned above, it has been determined that atmospheric air normally includes a carbon dioxide content of 320 p.p.m. A portion of the total carbon dioxide content exists in solid phase in the liquid crude oxygen and a portion is dissolved therein depending upon the purity of the crude oxygen. For example, in the case of liquid crude oxygen of 30% purity approximately 2% of the normal carbon dioxide content of 320 p.p.m. is dissolved in the liquid crude oxygen while 98% is present in solid phase; for the purpose of this calculation the portion of the carbon dioxide dissolved in the gaseous air, comprising an insignificant percentage of the total carbon dioxide content, is disregarded. In this example the filters are designed to pass a stream of liquid crude oxygen, at the rate of flow required for the fractionating operation, and including at least 98% of the total carbon dioxide content, without requiring an excessively high switching rate. The adsorbers have a capacity necessary to adsorb 2% of the total carbon dioxide and remove the solid carbon dioxide passed by the filters, the latter quantity being determined by experimentation.

In an arrangement in which the filter-adsorber combination 42 is located upstream of the crude oxygen expansion valve 50, as shown, a liquid phase stream flows through the filters and adsorbers, while in a cycle in which the crude oxygen expansion valve is located upstream of the filter-adsorber combination a stream including liquid phase and gaseous phase components flows therethrough and filters and adsorbers of larger capacity would be required. Also, filters and adsorbers of relatively smaller size are required in the cycle of Figure 2 as compared to the size of the filters and adsorbers necessary in the Figure 1 arrangement since in the latter arrangement the filter-adsorber combination passes a stream in gaseous phase or a gaseous stream including a portion of the gaseous mixture in liquid phase.

When the stream of gaseous feed mixture, at relatively high superatmospheric pressure such that the high boiling point impurity exists in gaseous phase as a component of the feed mixture, is expanded to establish the pressure and temperature conditions resulting in precipitation of high boiling impurity, the precipitated high boiling impurity will exist in molecular form and as a finely dispersed aerosol and will possess very little if any tendency to adhere to surfaces of the expansion valve and will dissolve in and/or become entrained as a solid in the expanded feed mixture. Inasmuch as a small percentage of the precipitated high boiling point impurity may adhere to surfaces of the expansion valve, and after extended periods of operation deposits may build up to such an extent as to effect operation of the cycle, an auxiliary expansion valve 40A may be provided in the cycle and connected in parallel with the expansion valve 40, conventional control valves being provided for placing one of the expansion valves 40 and 40A in the cycle and isolating the other from the cycle for defrosting purposes, or for placing the expansion valve 40A in the cycle to compensate for high boiling impurity deposits accumulating in the expansion valve 40.

It has been determined that a cycle embodying the principles of the present invention illustrated in Figures 1 and 2 of the drawings may be operated so that the temperature of the gaseous mixture is reduced to below the precipitation temperature of high boiling impurity while flowing through the heat exchanger 11. This is possible since high boiling impurity, such as carbon dioxide, first precipitates in extremely small particles which are swept from the heat exchanger by a relatively high velocity stream of gaseous mixture and carried to the expansion valve. Thus it is not necessary in order to practice the present invention to maintain the temperature and pressure conditions of the gaseous mixture upstream of the expansion valve such that the high boiling impurity is in gaseous phase.

The present invention thus provides a novel method of an apparatus for the separation of gaseous mixtures including high boiling point impurities, such as the fractionation of air into oxygen and nitrogen components in which carbon dioxide comprises the major high boiling point impurity. The present invention eliminates the need of chemical scrubbing of the incoming air feed to remove carbon dioxide, the use of switching heat exchangers and the necessity to unbalance such heat exchangers for adequate operation, as well as the use of scrubbing towers by which the cooled air stream is scrubbed by a liquid including a component thereof. This is accomplished by forming a fluid stream, usually after the main expansion valve, including substantially the total high boiling impurity in the gaseous mixture, partly dissolved in the fluid stream and partly present in solid phase therein, and feeding the fluid stream through a novel arrangement of filters and adsorbers to remove both the dissolved and solid high boiling impurity therefrom. The filters and adsorbers are arranged in pairs so that one filter and adsorber is switched on-stream while the other filter and adsorber is switched off-stream for purging and reactivation. The present invention also provides a novel arrangement for purifying the filter-adsorber sets which aids in maintaining desired temperature levels and provides for efficient purging and reactivation.

Although several embodiments of the invention have been disclosed and described herein, it is to be expressly understood that various changes and substitutions may be made therein without departing from the spirit of the invention as well understood by those skilled in the art. For example, although the present invention has been disclosed and described in the environment of low temperature air separation in which carbon dioxide is considered as the high boiling point impurity to be removed, it is to be expressly understood that in the separation of air the present invention is capable of removing other high boiling point impurities, such as hydrocarbons, and that the principles of the present invention may be employed in connection with cycles for the separation of other gaseous mixtures. Reference therefore will be had to the appended claims for a definition of the limits of the invention.

What is claimed is:

1. Method of separating low boiling point components of gaseous mixtures including a high boiling point impurity, which comprises compressing gaseous mixture including high boiling point impurity to a predetermined superatmospheric pressure, passing the compressed gaseous mixture through a heat exchange zone in heat exchange relation with relatively cold product of an ensuing fractionating step to cool the gaseous mixture to a relatively low temperature, the predetermined pressure of the compressed gaseous mixture being such that the compressed gaseous mixture at the relatively low temperature leaving the heat exchange zone is above the precipitation temperature of the high boiling point impurity corresponding to the predetermined pressure, expanding the cool gaseous mixture to a relatively low pressure to reduce its temperature to below the precipitation temperature of the high boiling point impurity corresponding to the relatively low pressure, the expanded gaseous mixture including precipitated high boiling point impurity and non-precipitated high boiling point impurity, the precipitated high boiling point impurity and the non-precipitated high boiling point impurity of the expanded gaseous mixture comprising substantially the total high boiling point impurity of the compressed gaseous mixture, forming a fluid comprising components of the gaseous mixture and including substantially the total high boiling point impurity of the expanded gaseous mixture, subjecting the fluid to a purification step and then to a fractionating step to produce low boiling point components of the gaseous mixture as product, the purification step consisting of passing the fluid through filter and adsorber zones to substantially completely remove the high boiling point impurity therefrom.

2. Method of separating low boiling point components of gaseous mixtures including a high boiling point impurity, which comprises compressing gaseous mixture to a predetermined superatmospheric pressure, removing moisture from the compressed gaseous mixture, passing the compressed gaseous mixture through a heat exchange zone in heat exchange relation with relatively cold product of an ensuing fractionating step to cool the gaseous mixture to a relatively low temperature, the predetermined pressure of the compressed gaseous mixture being such that the gaseous mixture at the relatively low temperature leaving the heat exchange zone is above the precipitation temperature of the high boiling point impurity corresponding to the predetermined pressure, expanding the cool gaseous mixture to a relatively low pressure to reduce its temperature to below the precipitation temperature of the high boiling point impurity corresponding to the relatively low pressure, the expanded gaseous mixture including precipitated high boiling point impurity and non-precipitated high boiling point impurity, the precipitated high boiling point impurity and the non-precipitated high boiling point impurity in the expanded gaseous mixture comprising substantially the total high boiling point impurity of the compressed gaseous mixture, forming a fluid comprising components of the gaseous mixture and including substantially the total high boiling point impurity of the expanded gaseous mixture, subjecting the fluid to a purification step and then to a fractionating step to produce low boiling point components of the gaseous mixture as product, the purification step consisting of passing the fluid through filter and adsorber zones to substantially completely remove the high boiling point impurity therefrom.

3. Method of separating low boiling point components of gaseous mixtures including higher boiling point impurities, which comprises compressing gaseous mixture including the high boiling point impurities to a predetermined superatmospheric pressure, passing the compressed gaseous mixture through a heat exchange zone in heat exchange relation with relatively cold product of an ensuing fractionating step to cool the gaseous mixture to a relatively low temperature, the predetermined pressure of the compressed gaseous mixture being such that the compressed gaseous mixture at the relatively low temperature leaving the heat exchange zone is above the highest precipitation temperature of the high boiling point impurities corresponding to the predetermined pressure, expanding the cool gaseous mixture to a relatively low pressure to reduce its temperature to below the highest precipitation temperature of the high boiling point impurities corresponding to the relatively low pressure, the expanded gaseous mixture including precipitated high boiling point impurities and non-precipitated high boiling point impurities, the precipitated high boiling pont impurities and the non-precipitated high boiling point impurities of the expanded gaseous mixture comprising substantially the total high boiling point impurities of the compressed gaseous mixture, forming a fluid comprising components of the gaseous mixture and including substantially the total high boiling point impurities of the expanded gaseous mixture, subjecting the fluid to a purification step and then to a fractionating step to produce low boiling point components of the gaseous mixture as product, the purification step consisting of passing the fluid through filter and adsorber zones to substantially completely remove the high boiling point impurities therefrom.

4. Method of separating low boiling point components of gaseous mixtures including a higher boiling point impurity, which comprises compressing gaseous mixture including high boiling point impurity to a predetermined superatmospheric pressure, passing the compressed gaseous mixture through a heat exchange zone in heat exchange relation with relatively cold product of an ensuing fractionating step to cool the compressed gaseous mixture to a relatively low temperature, the predetermined pressure of the compressed gaseous mixture being such that the compressed gaseous mixture at the relatively low temperature leaving the heat exchange zone is above the precipitation temperature of the high boiling point impurity corresponding to the predetermined pressure, expanding the cool gaseous mixture to a relatively low pressure to reduce its temperature to below the precipitation temperature of the high boiling point impurity corresponding to the relatively low pressure, the expanded gaseous mixture including precipitated high boiling point impurity and non-precipitated high boiling point impurity, the precipitated high boiling point impurity and the non-precipitated high boiling point impurity of the expanded gaseous mixture comprising substantially the total high boiling point impurity of the compressed gaseous mixture, forming a fluid comprising components of the gaseous mixture and including substantially the total high boiling point impurity of the expanded gaseous mixture, subjecting the fluid to a purification step and then to a fractionating step to produce low boiling point components of the gaseous mixture as product, the purification step consisting of alternately passing the fluid serially through first and second filter-adsorber zones to substantially completely remove high boiling point impurity therefrom and alternately passing relatively warm gas substantially free of the high boiling point impurity through the first and second filter-adsorber zones to remove high boiling point impurity accumulated in the zones.

5. Method of separating gaseous mixtures as defined in claim 4 in which the stream of relatively warm gas alternately passed through the first and second filter-adsorber zones is passed through the filter zones in countercurrent relation with respect to the flow of fluid therethrough and is passed through the adsorber zones in concurrent relation with respect to the flow of fluid therethrough.

6. Method of separating oxygen and nitrogen components of atmospheric air including carbon dioxide which comprises the steps of compressing atmospheric air including carbon dioxide to a predetermined superatmospheric pressure, passing the compressed atmospheric air including carbon dioxide through a heat exchange zone in heat exchange relation with relatively cold product of an ensuing fractionating step to cool the compressed air to a relatively low temperature, the predetermined pressure of the air being such that the compressed air at the relatively low temperature leaving the heat exchange zone is above the precipitation temperature of carbon dioxide corresponding to the predetermined pressure, expanding the cooled air including the carbon dioxide to a relatively low pressure to reduce its temperature to below the precipitation temperature of carbon dioxide corresponding to the relatively low pressure, the expanded air including precipitated carbon dioxide and non-precipitated carbon dioxide, the precipitated carbon dioxide and the non-precipitated carbon dioxide of the expanded air comprising substantially the total carbon dioxide of the compressed atmospheric air, forming from the expanded air a fluid comprising components of air and including substantially the total carbon dioxide of the expanded air, subjecting the fluid to a purification step and then to a fractionating step to produce low boiling point oxygen and nitrogen components as product, the purification step consisting of passing the fluid through filter-adsorber zones to substantially completely remove the carbon dioxide therefrom.

7. The method of separating oxygen and nitrogen components of atmospheric air as defined in claim 6 in which the purification step consists of alternately passing the fluid serially through first and second filter-adsorber zones to substantially completely remove carbon dioxide therefrom and of alternately passing relatively warm gas substantially free of carbon dioxide through the first and second filter-adsorber zones to remove carbon dioxide accumulated in the zones.

8. Method of separting low boiling point components of gaseous mixtures including a high boiling point impurity, which comprises compressing gaseous mixture including high boiling point impurity to a predetermined superatmospheric pressure, passing the compressed gaseous mixture through a heat exchange zone in heat exchange relation with relatively cold product of an ensuing fractionating step to cool the gaseous mixture to a relatively low temperature, the predetermined pressure of the gaseous mixture being such that the compressed gaseous mixture at the relatively low temperature leaving the heat exchange zone is above the precipitation temperature of the high boiling point impurity corresponding to the predetermined pressure, expanding the cool gaseous mixture to a relatively low pressure to reduce its temperature to below the precipitation temperature of the high boiling point impurity corresponding to the relatively low pressure, the expanded gaseous mixture including precipitated high boiling point impurity and non-precipitated high boiling point impurity, the precipitated high boiling point impurity and the non-precipitated high boiling point impurity of the expanded gaseous mixture comprising substantially the total high boiling point impurity of the compressed gaseous mixture, subjecting the expanded gaseous mixture to a purification step and then to a fractionating step to produce low boiling point components of the gaseous mixture as product, the purification step consisting of passing the expanded gaseous mixture through filter-adsorber zones to substantially completely remove high boiling point impurity therefrom.

9. Method of separating low boiling point components of gaseous mixtures as defined in claim 8 in which the purification step consists of alternately passing the expanded gaseous mixture serially through first and second filter-adsorber zones to substantially completely remove high boiling point impurity therefrom and of alternately passing a relatively warm gas substantially free of high boiling point impurity through the first and second filter-adsorber zones to remove high boiling point impurity accumulated in the zones.

10. Method of separating low boiling point components of gaseous mixtures as defined in claim 9 in which the relatively warm gas alternately passed through the first and second filter-adsorber zones is passed through the filter zones in countercurrent relation with respect to the direction of flow of expanded gaseous mixture therethrough and is passed through the adsorber zones in concurrent relation with respect to the direction of flow of expanded gaseous mixture therethrough.

11. Method of separating oxygen and nitrogen components of atmospheric air including carbon dioxide, which comprises the steps of compressing atmospheric air including carbon dioxide to a predetermined superatmospheric pressure, passing the compressed air through a heat exchange zone in heat exchange relation with relatively cold product of an ensuing fractionating step to cool the compressed air to a relatively low temperature, the predetermined pressure of the air being such that the compressed air at the relatively low temperature leaving the heat exchange zone is above the precipitation temperature of carbon dioxide corresponding to the predetermined pressure, expanding the compressed air to a relatively low temperature to reduce its temperature to below the precipitation temperature of carbon dioxide corresponding to the relatively low pressure, the expanded air including precipitated carbon dioxide and non-precipitated carbon dioxide, the precipitated carbon dioxide and the non-precipitated carbon dioxide of the expanded air comprising substantially the total carbon dioxide of the compressed air, subjecting the expanded air to a purification step and then to a fractionating step to produce low boiling point oxygen and nitrogen components as product, the purification step consisting of passing the expanded air through filter-adsorber zones to substantially completely remove carbon dioxide therefrom.

12. Method of separating oxygen and nitrogen components of atmospheric air as defined in claim 11 in which the purification step consists of alternately passing the expanded air serially through first and second filter-adsorber zones to substantially completely remove carbon dioxide therefrom and of alternately passing relatively warm gas substantially free of carbon dioxide through the first and second filter-adsorber zones to remove carbon dioxide accumulated in the zones.

13. Method of separating low boiling point components of gaseous mixtures including a higher boiling point impurity, which comprises compressing gaseous mixture including high boiling point impurity to a predetermined superatmospheric pressure, passing the compressed gaseous mixture through a heat exchange zone in heat exchange relation with relatively cold product of an ensuing fractionating step to cool the gaseous mixture to a relatively low temperature, the predetermined pressure of the compressed gaseous mixture being such that the compressed gaseous mixture at the relatively low temperature leaving the heat exchange zone is above the precipitation temperature of the high boiling point impurity corresponding to the predetermined pressure, expanding the cool gaseous mixture to a relatively low pressure to reduce its temperature to below the precipitation temperature of the high boiling point impurity corresponding to the relatively low pressure, the expanded gaseous mixture including precipitated high boiling point impurity and non-precipitated high boiling point impurity, the precipitated high boiling point impurity and the non-precipitated high boiling point impurity of the expanded gaseous mixture comprising substantially the total high boiling point impurity of the compressed gaseous mixture, forming a liquid comprising components of the gaseous mixture and including substantially the total high boiling point impurity of the expanded gaseous mixture, subjecting the liquid to a purification step and then to a fractionating step to produce low boiling point components of the gaseous mixture as product, the purification step consisting of passing the liquid through filter and adsorber zones to substantially completely remove the high boiling point impurity therefrom.

14. A method of separating in a fractionating operation low boiling point components of gaseous mixtures including high boiling point impurity, in which operation gaseous mixture is fed to a high pressure fractionating zone wherein the mixture undergoes preliminary fractionation producing a liquid fraction and a gaseous fraction and in which liquid fraction is fed to the low pressure fractionating zone wherein the fractionation is completed producing relatively cold liquid and gaseous product, which method comprises compressing gaseous mixture including high boiling point impurity, passing compressed gaseous mixture through a heat exchange zone in heat exchange with cold product of the fractionating operation to cool the compressed gaseous mixture to a relatively low temperature, expanding the cool gaseous mixture to reduce its temperature, the expanded gaseous mixture including precipitated high boiling point impurity and non-precipitated high boiling point impurity, the precipitated high boiling point impurity and the non-precipitated high boiling point impurity of the expanded gaseous mixture comprising substantially the total high boiling point impurity of the compressed gaseous mixture, passing the expanded gaseous mixture into the high pressure zone and transferring substantially the total high boiling point impurity in the expanded gaseous mixture to the liquid fraction collecting in the base of the high pressure zone, the high boiling point impurity in the liquid fraction comprising precipitated high boiling point impurity and high boiling point impurity dissolved in liquid fraction in accordance with the solubility of high boiling point impurity in the liquid fraction, withdrawing liquid fraction from the high pressure zone, subjecting the withdrawn liquid fraction to a purification step and then introducing the liquid fraction into the low pressure fractionating zone, the purification step consisting of passing the liquid through filter-adsorber zones to substantially completely remove high boiling point impurity therefrom.

15. Method of separating in a fractionating operation low boiling point components of gaseous mixtures as defined in claim 14 in which the purification step consists of alternately passing the withdrawn liquid fraction serially through first and second filter-adsorber zones to substantially completely remove the precipitated and the dissolved high boiling point impurity therefrom and of alternately passing relatively warm gas free of high boiling point impurity through the first and second filter-adsorber zones to remove high boiling point impurity accumulated in the zones.

16. Method of separating in a fractionating operation low boiling point components of gaseous mixtures as defined in claim 15 in which the relatively warm gas passes through the filter zones in countercurrent relation with respect to the direction of flow of liquid fraction therethrough and passes through the adsorber zones in concurrent relation with respect to the direction of flow of the liquid fraction therethrough.

17. Method of separating atmospheric air including carbon dioxide into oxygen and nitrogen components by a fractionating operation, in which operation atmospheric air is fed to a high pressure fractionating zone wherein the air undergoes preliminary fractionation producing a liquid crude oxygen fraction and a gaseous nitrogen fraction and in which the liquid crude oxygen fraction is fed to the low pressure fractionating zone wherein the fractionation is completed producing relatively cold liquid oxygen and gaseous nitrogen product, which method comprises compressing atmospheric air including carbon dioxide to a predetermined superatmospheric pressure, passing the compressed air through a heat exchange zone in heat exchange relation with cold product of the fractionating operation to cool the compressed air to a relatively low temperature, the predetermined pressure of the compressed air being such that the compressed air at the relatively low temperature leaving the heat exchange zone is above the precipitation temperature of carbon dioxide corresponding to the predetermined pressure, expanding the cool compressed air to a relatively low pressure to reduce its temperature to below the precipitation temperature of carbon dioxide corresponding to the relatively low pressure, the expanded air including precipitated carbon dioxide and non-precipitated carbon dioxide, the precipitated carbon dioxide and the non-precipitated carbon dioxide comprising substantially the total carbon dioxide of the compressed air, passing the expanded air into the high pressure zone and transferring substantially the total carbon dioxide of the expanded air to the liquid crude oxygen fraction, the carbon dioxide in the liquid crude oxygen fraction comprising precipitated carbon dioxide and carbon dioxide dissolved in the crude oxygen fraction in accordance with the solubility of carbon dioxide in the crude oxygen fraction, withdrawing liquid crude oxygen from the high pressure zone, subjecting the withdrawn liquid crude oxygen to a purification step and then introducing the crude oxygen fraction into the low pressure fractionating zone, the purification step consisting of passing the crude oxygen through a filter zone to remove precipitated carbon dioxide therefrom and then passing the liquid crude oxygen through an adsorber zone to substantially completely remove carbon dioxide therefrom including dissolved carbon dioxide and precipitated carbon dioxide that may pass through the filter zone.

18. Method of separating atmospheric air including carbon dioxide into oxygen and nitrogen components as defined in claim 17 in which the purification step consists of alternately passing the withdrawn crude oxygen fraction serially through first and second sets of filter and adsorber zones to substantially completely remove the solid and dissolved carbon dioxide therefrom and of alternately passing relatively warm gas through the first and second sets of filter and adsorber zones to remove carbon dioxide accumulated in the filter and adsorber zones.

19. Method of separating low boiling point components of gaseous mixtures including higher boiling point impurity, which comprises compressing gaseous mixture including high boiling point impurity to a predetermined superatmospheric pressure, passing the compressed gaseous mixture through a heat exchange zone in heat exchange relation with relatively cold product of an ensuing fractionating step to cool the gaseous mixture to a relatively low temperature, the predetermined pressure of the compressed gaseous mixture being such that the gaseous mixture at the relatively low temperature leaving the heat exchange zone is above the precipitation temperature of the high boiling point impurity corresponding to the predetermined pressure, expanding the cool gaseous mixture to a relatively low pressure to reduce its temperature to below the precipitation temperature of the high boiling point impurity corresponding to the relatively low pressure, the expanded gaseous mixture including precipitated high boiling point impurity and non-precipitated high boiling point impurity, the precipitated high boiling point impurity and the non-precipitated high boiling point impurity of the expanded gaseous mixture comprising substantially the total high boiling point impurity of the compressed gaseous mixture, forming a fluid comprising components of the gaseous mixture and including substantially the total high boiling point impurity of the expanded gaseous mixture, subjecting the fluid to a purification step and then to a fractionating step in a fractionating zone wherein the fluid is separated into low boiling point components of the gaseous mixture as product, the purification step consisting of passing the fluid through filter and adsorber zones to substantially completely remove the high boiling point impurity therefrom, the fluid passing through the filter and adsorber zones to the fractionating zone comprising the total feed to the fractionating zone.

20. Method of separating low boiling point components of gaseous mixtures including a high boiling point impurity, which comprises compressing gaseous mixture including high boiling point impurity to a predetermined superatmospheric pressure, passing the compressed gaseous mixture through a heat exchange zone in heat exchange relation with relatively cold product of an ensuing fractionating step to cool the gaseous mixture to a relatively low temperature, the predetermined pressure of the gaseous mixture being such that the compressed gaseous mixture at the relatively low temperature leaving the heat exchange zone is above the precipitation temperature of the high boiling point impurity corresponding to the predetermined pressure, expanding the cool gaseous mixture to a relatively low pressure to reduce its temperature to below the precipitation temperature of the high boiling point impurity corresponding to the relatively low pressure, the expanded gaseous mixture including precipitated high boiling point impurity and non-precipitated high boiling point impurity, the precipitated high boiling point impurity and the non-precipitated high boiling point impurity of the expanded gaseous mixture comprising substantially the total high boiling point impurity of the compressed gaseous mixture, subjecting the expanded gaseous mixture to a purification step and then to a fractionating step in a fractionating zone wherein the expanded gaseous mixture is separated into low boiling point components of the gaseous mixture as product, the purification step consisting of passing the expanded gaseous mixture through filter-adsorber zones to substantially completely remove high boiling point impurity therefrom, the expanded gaseous mixture passing through the filter-adsorber zones to the fractionating zone comprising the total feed to the fractionating zone.

21. A method of separatng in a fractionating operation low boiling point components of gaseous mixtures including high boiling point impurity, in which operation gaseous mixture is fed to a high pressure fractionating zone wherein the mixture undergoes preliminary fractionation producing a liquid fraction and a gaseous fraction and in which liquid fraction is fed to the low pressure fractionating zone wherein the fractionation is completed producing relatively cold liquid and gaseous product, which method comprises compressing gaseous mixture including high boiling point impurity, passing compressed gaseous mixture through a heat exchange zone in heat exchange with cold product of the fractionating operation to cool the compressed gaseous mixture to a relatively low temperature, expanding the cool gaseous mixture to reduce its temperature, the expanded gaseous mixture including precipitated high boiling point impurity and non-precipitated high boiling point impurty, the precipitated high boiling point impurity and the non-precipitated high boiling point impurity of the expanded gaseous mixture comprising substantially the total high boiling point impurity of the compressed gaseous mixture, passing the expanded gaseous mixture into the high pressure zone and transferring substantially the total high boiling point impurity in the expanded gaseous mixture to the liquid fraction collecting in the base of the high pressure zone, the high boiling point impurity in the liquid fraction comprising precipitated high boiling pont impurity and high boiling point impurity dssolved in liquid fraction in accordance with the solubility of high boiling point impurity in the liquid fraction, withdrawing liquid fraction from the high pressure zone, subjecting the withdrawn liquid fraction to a purification step and then introducing the liquid fraction into the low pressure fractionating zone, the purification step consisting of passing the liquid through filter-adsorber zones to substantially completely remove high boiling point impurity therefrom, the withdrawn liquid fraction passed through the filter-adsorber zones comprising the total feed to the low pressure fractionating zone.

22. Method of purifying sets of parallel connected filter-adsorber zones, through which sets a fluid stream containing precipitated and non-precipitated high boiling impurity alternately flows to remove the impurity therefrom and deposit the impurity in the zones, which method comprises flowing a fluid substantially free of the impurity alternately through the sets of filter and adsorber zones, the warm fluid flowing through the filter zones of the sets in countercurrent relation with respect to the direction of flow of the fluid stream therethrough and the warm fluid flowing through the adsorber zones in concurrent relation with respect to the direction of flow of the fluid stream therethrough.

23. Apparatus for separating low boiling components of gaseous mixtures including a high boiling point impurity, fractionating means for producing relatively cold product comprising components of the gaseous mixture, means for compressing gaseous mixture including high boiling point impurity, means including a heat exchanger for passing the compressed gaseous mixture in heat exchange relation with relatively cold product from the fractionating means to cool the stream of gaseous mixture to a relatively low temperature, means for maintaining the compressed gaseous mixture above a predetermined pressure such that the compressed gaseous mixture is above the precipitation temperature of the high boiling impurity at the relatively low temperature, expansion means for expanding the cold gaseous mixture to a relatively low pressure to reduce its temperature to below the precipitation temperature of the high boiling point impurity at the low pressure, means forming a fluid including substantially the total high boiling point impurity of the expanded gaseous mixture, filter-adsorber means, and means for condutcing the fluid through the filter-adsorber means and from the filter-adsorber means to the fractionating means.

24. Apparatus for separating low boiling components of gaseous mixtures including a high boiling point impurity as defined in claim 23 in which the filter-adsorber means includes filter means of a capacity to remove precipitated high boiling impurity from the fluid and adsorber means of a capacity to substantially completely remove the remaining high boiling impurity from the fluid.

25. Apparatus for separating low boiling components of gaseous mixtures including a high boiling point impurity as defined in claim 24 in which the filter means and the adsorber means include a first filter and a first adsorber connected in series and a second filter and a second adsorber connected in series, and in which means are provided for alternately connecting the first filter and the first adsorber and the second filter and the second adsorber between the fluid forming means and the fractionating means.

26. Apparatus for separating low boiling components of gaseous mixtures including a high boil'ng point impurity as defined in claim 24 in which the filter means nately introducing a relatively warm fluid into the series connection between the first filter and the first adsorber and between the second filter and second adsorber, and means for withdrawing the warm fluid from the opposite ends of respective filters and adsorbers.

References Cited in the file of this patent
UNITED STATES PATENTS

| | | |
|---|---|---|
| 1,875,199 | Parkman | Aug. 30, 1932 |
| 2,383,065 | Lehman | Aug. 21, 1945 |
| 2,386,297 | Dennis | Oct. 9, 1945 |
| 2,413,752 | Dennis | Jan. 7, 1947 |
| 2,423,543 | Yendall | July 8, 1947 |
| 2,431,866 | Dennis | Dec. 2, 1947 |
| 2,572,933 | Houvener | Oct. 30, 1951 |
| 2,584,381 | Dodge | Feb. 5, 1952 |
| 2,615,312 | Yendall | Oct. 28, 1952 |
| 2,617,275 | Goff | Nov. 11, 1952 |
| 2,622,416 | Ogorzaly | Dec. 23, 1952 |
| 2,643,525 | Cartier | June 30, 1953 |
| 2,650,481 | Cooper | Sept. 1, 1953 |
| 2,650,482 | Lobo | Sept. 1, 1953 |
| 2,655,796 | Rice | Oct. 20, 1953 |
| 2,668,425 | Skaperdas | Feb. 9, 1954 |
| 2,715,323 | Johnson | Aug. 16, 1955 |
| 2,753,950 | Baker | July 10, 1956 |

FOREIGN PATENTS

| | | |
|---|---|---|
| 639,702 | France | Mar. 17, 1928 |

UNITED STATES PATENT OFFICE
CERTIFICATION OF CORRECTION

Patent No. 2,968,160                                               January 17, 1961

Clarence J. Schilling et al.

It is hereby certified that error appears in the above numbered patent requiring correction and that the said Letters Patent should read as corrected below.

Column 2, line 26, after "includes" insert -- solid or --; column 7, line 40, for "71-73" read -- 70-72 --; line 51, for "76" read -- 86 --; column 8, line 15, after "valve" insert -- 40 --; column 9, line 15, for "the carbon dioxide dissolved" read -- the non-precipitated carbon dioxide --; column 10, line 6, for "an" read -- and --; column 14, line 60, for "the" read -- a --; column 17, line 42, for "dssolved" read -- dissolved --; column 18, line 39, for "24 in which the filter means" read -- 25 including means for alter- --.

Signed and sealed this 12th day of September 1961.

(SEAL)
Attest:

ERNEST W. SWIDER                                    DAVID L. LADD
Attesting Officer                                 Commissioner of Patents